(No Model.)
F. J. B. CORDEIRO.
SEXTANT.
No. 595,527.  Patented Dec. 14, 1897.
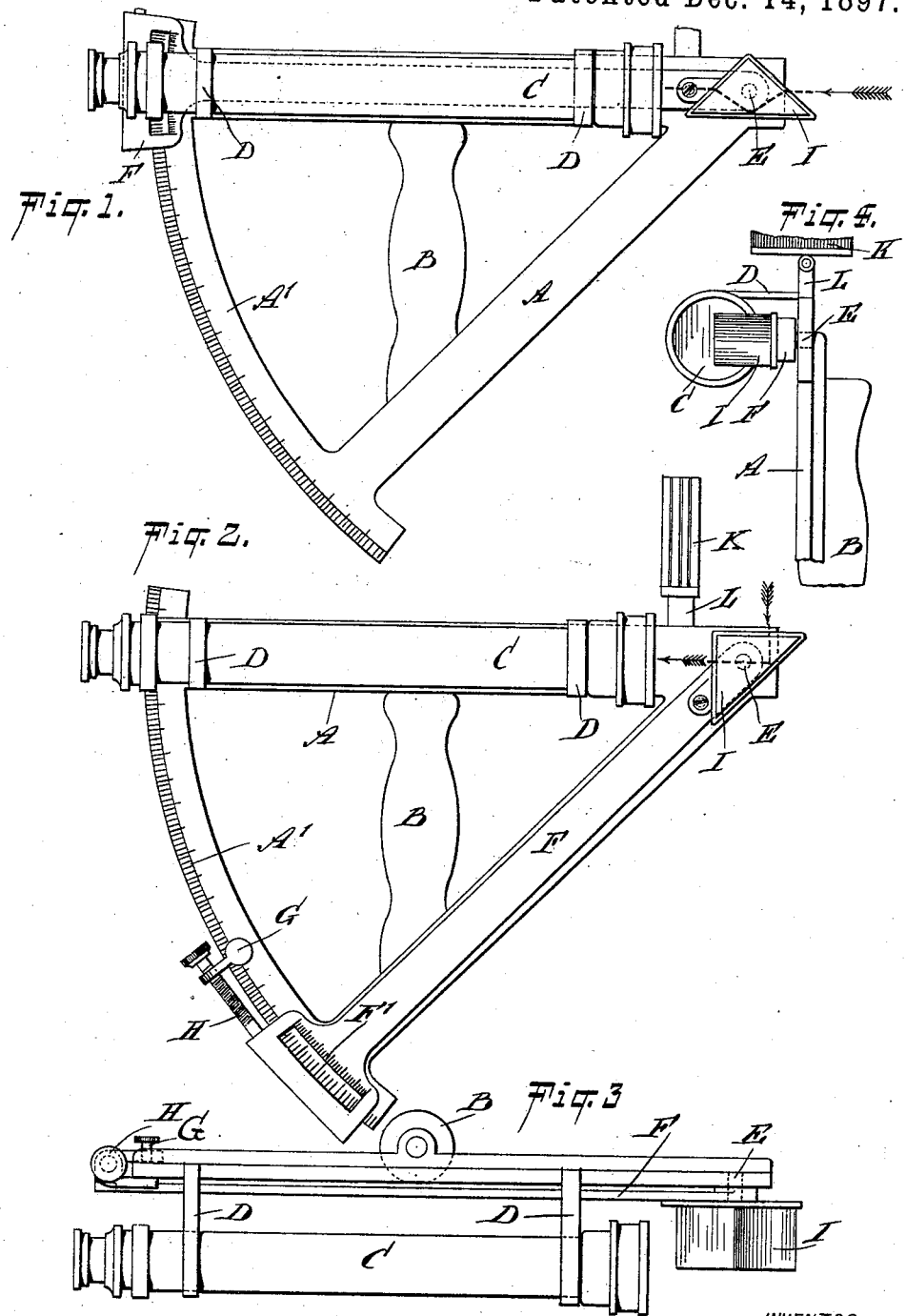
WITNESSES:
William P. Goebel.
John Lotka
INVENTOR
BY F. J. B. Cordeiro.
ATTORNEYS.

UNITED STATES PATENT OFFICE.

FREDERICK JOAQUIM BARBOSA CORDEIRO, OF THE UNITED STATES NAVY.

SEXTANT.

SPECIFICATION forming part of Letters Patent No. 595,527, dated December 14, 1897.

Application filed March 16, 1897. Serial No. 627,802. (No model.)

*To all whom it may concern:*

Be it known that I, FREDERICK JOAQUIM BARBOSA CORDEIRO, of the United States Navy, have invented a new and Improved Sextant, of which the following is a full, clear, and exact description.

My invention relates to sextants, and has for its object to produce a sextant in which observation will be facilitated, in that the image observed by indirect vision will be brighter and more distinct than with the usual arrangement.

Other objects of the invention are to produce a sextant which will be simpler than those in use at present, the horizon-glass being omitted in the new sextant; also, the adjustment will be easier and the instrument will have no parallax.

These features of improvement are obtained by means of the novel construction hereinafter described and claimed.

Reference is to be had to the accompanying drawings, forming a part of this specification, in which similar characters of reference indicate corresponding parts in all the figures.

Figure 1 is a side elevation of the improved sextant with parts broken off. Fig. 2 is a like view thereof with the index-arm in a different position. Fig. 3 is a plan of the instrument, and Fig. 4 is an end view thereof from the object-glass of the telescope with parts broken away.

The improved sextant comprises a frame A, having a graduated arc A' and provided with a handle B. Laterally of the frame is arranged the telescope C or equivalent device for direct vision, the telescope being rigidly secured to the frame by means of straps D. Provision may be made by suitable construction for adjusting the telescope toward or from the frame without changing the direction of the telescope's axis.

Adjacent to the object-glass end of the telescope is pivoted, as at E, the index-arm F, adapted to move over the graduated arc A'.

G is the ordinary clamp for roughly securing the arm to the arc in the desired position, while a finer adjustment is obtained by means of the micrometric screw H, engaging the clamp and the index-arm.

The index-arm has the usual vernier F'.

So far as above described the construction of the instrument need not differ materially from that of an ordinary sextant.

To the pivot end of the index-arm F is rigidly secured an isosceles prism I (preferably a right-angled prism) with its axis parallel to the pivot E—that is, perpendicular to the plane of the sextant. The length of the prism is about equal to the aperture of the telescope, and its end surface is approximately in the vertical axial plane of the telescope, as will be seen best by reference to Figs. 3 and 4. The basal surface of the prism (in the example shown its hypotenusal surface) is parallel to the longitudinal axis of the index-arm—that is, parallel to the line connecting the pivot E to the zero-mark of the vernier F'. The arm F swings between the frame A and the telescope C, the straps D being placed at one side, so that the arm can be swung into the position shown in Fig. 1, with its longitudinal axis parallel to that of the telescope. In this position the direct and indirect images will appear superposed, as the rays of light parallel to the axis of the telescope leave the prism parallel to their original direction after double refraction and single reflection, as indicated in Fig. 1. When the index-arm is turned about its pivot E, the rays of light passing through the prism and leaving it parallel to the axis of the telescope will be deflected through an angle equal to twice the angle the arm has been moved from its original position. This principle is well known in optics, but the particular way in which I utilize it I believe to be novel.

As an adjunct I may provide a series of smoked or colored glasses K, pivoted to a post L, secured rigidly to the frame A, said glasses being adapted to be swung into the space between the prism and the telescope. (See Fig. 2.)

It will be observed that the horizon-glass commonly attached to the frame of the instrument is omitted in my improved sextant. The rays of light are reflected but once and the reflection is total, thereby increasing the brightness of the indirect image. Furthermore, the adjustment is simpler, as there is but one prism to be adjusted instead of two mirrors; also, the instrument has no parallax, which is of considerable advantage when ascertaining angles between objects at a short distance from the observer, as in such cases the ordinary sextant can be used only with troublesome corrections for the parallax.

The manipulation of the instrument is the usual one, and consists in turning the index-arm until the indirect image of one object (produced by reflection in the prism) and the image seen directly in the telescope are superposed. By adjusting the telescope toward and from the frame a greater or smaller portion of the prism is brought into the field of the telescope, and thus the two images can be adjusted until they are of equal brightness. The same result could be obtained, of course, by adjusting the prism in the direction of its axis.

Various modifications may be made without departing from the nature of my invention.

Having thus fully described my invention, I claim as new and desire to secure by Letters Patent—

1. In a sextant or the like, the frame having a graduated arc, an index-arm pivoted at one end to the said frame and an isosceles prism carried by said arm near its pivot, the axis of the said prism being parallel to the pivot of the said index-arm, substantially as described.

2. In a sextant or the like, the frame having a graduated arc, the index-arm pivoted at one end to said frame and a right-angled prism carried by said arm at its pivot end, the axis of the said right-angled prism being parallel to the pivot of said arm, substantially as described.

3. In a sextant or the like, the frame having a graduated arc, a telescope or equivalent device for direct observation, an index-arm pivoted at one end to said frame and adapted to swing between the frame and the telescope, the said index-arm being provided near its pivot with an isosceles prism rigidly secured to said arm, the end surface of the said prism bisecting approximately the field of the telescope, the axis of the said prism being parallel to the pivot of the said index-arm, substantially as described.

4. In a sextant or the like, the combination with the frame having a graduated arc, and a telescope or equivalent device for direct observation, the said telescope being arranged at one side of the said frame and secured thereto, of the index-arm pivoted at one end to said frame and adapted to swing between the frame and the telescope, an isosceles prism rigidly secured to the pivot end of the said arm, the end surface of the said prism bisecting approximately the field of the telescope, the axis of the said prism being parallel to the pivot of said index-arm, and absorbing-glasses hinged to the frame and adapted to be swung between the prism and the adjacent end of the telescope, substantially as described.

5. In a sextant or the like, the frame having a graduated arc and a telescope or equivalent device for direct observation in combination with the index-arm pivoted to the frame and adapted to swing between the frame and the telescope, the said index-arm carrying near its pivot a prism whose axis is parallel to the pivot and whose free end surface is within the field of the telescope, the telescope and prism being adjustable in relation to each other in a direction parallel to the pivot of the index-arm to increase or diminish the size of that portion of the prism which is within the field of the telescope, substantially as described.

6. In a sextant or the like, a frame having a graduated arc, a telescope or equivalent device for direct observation, the said telescope being arranged at one side of the frame and secured thereto by means of straps, an index-arm pivoted to the said frame at a point adjacent to the object-glass end of the telescope, the said arm being adapted to move over the graduated arc and arranged to swing between the frame and the telescope, means for securing the index-arm to the arc, means for adjusting the said arm, and an isosceles prism secured to the pivot end of the said index-arm, the axis of the said prism being parallel to the pivot of the index-arm, the length of the said prism being about equal to the aperture of the telescope, and the end surface of said prism bisecting approximately the field of the telescope, substantially as described.

FREDERICK JOAQUIM BARBOSA CORDEIRO.

Witnesses:
GEORGE THORNTON EMMENS,
HARRY HANDLY CALDWELL.